Sept. 19, 1967   W. T. KAARLELA   3,342,971
METHOD FOR BRAZING SUPER ALLOYS AND REFRACTORY METALS
Original Filed June 16, 1964   2 Sheets-Sheet 1

WILLIAM T. KAARLELA
INVENTOR.

BY Charles C. Woodward
ATTORNEY

Sept. 19, 1967  W. T. KAARLELA  3,342,971
METHOD FOR BRAZING SUPER ALLOYS AND REFRACTORY METALS
Original Filed June 16, 1964  2 Sheets-Sheet 2

WILLIAM T. KAARLELA
INVENTOR.

BY Charles E. Woodward
ATTORNEY

United States Patent Office 3,342,971
Patented Sept. 19, 1967

3,342,971
METHOD FOR BRAZING SUPER ALLOYS AND REFRACTORY METALS
William T. Kaarlela, Fort Worth, Tex., assignor to General Dynamics Corporation, a corporation of Delaware
Original application June 16, 1964, Ser. No. 375,514. Divided and this application Sept. 7, 1966, Ser. No. 591,071
3 Claims. (Cl. 219—85)

ABSTRACT OF THE DISCLOSURE

A process for joining super alloy and refractory metals by brazing, using suitable braze materials and particularly prealloyed powder material mixed with a resin in water and brushed on the surfaces of the materials to be joined, wherein the materials are positioned within an enclosed environment, purging, slowly increasing the temperature of the materials to be joined to about 1600° F. and holding at this temperature to permit removal of the acrylic resin matrix in the braze alloy, resuming the heating operation at a rate of about 200° F. per minute to a temperature just below that at which recrystallization begins in the refractory metals which are being joined, rapidly raising the materials to the brazing temperature and rapidly terminating and cooling the thus brazed materials to a temperature below that at which recrystallization takes place, the time interval of the last two operations, i.e., the brazing and cooling, being one minute or less, so that the material is within its recrystallization zone for no more than sixty seconds and will thus result only in a maximum of about 5% recrystallization to prevent a significant effect on the properties of the base materials.

The present invention, a division of my co-pending application, Serial No. 375,514 filed June 16, 1964, relates generally to metal joining.

More particularly, the invention pertains to a metal joining process for refractory metals and super alloys.

The present invention is characterized by extremely brief heating and cooling cycles wherein metal joining techniques requiring various temperature-pressure relationships may be performed upon materials such as refractory metals, super alloys and the like, while at the same time providing such materials with a controlled environment, thus permitting joining of these materials to be effected without detrimental metallurgical changes occurring therein.

The aerospace industry, in particular, is confronted with the need for structural materials comprised of refractory metals and super alloys for use in present and future vehicles. This is due primarily to the inherent strength and stability at ultra-high temperatures of such metals. With the growing utilization of refractory metals a corresponding problem has arisen in the need for efficient processing of components fabricated therefrom. This problem is due to phenomena associated with refractory metals which causes them to recrystallize when subjected to the temperatures necessary to effect joining or annealing.

This recrystallization and its associated grain growth permanently and adversely affect the mechanical properties of refractory metal. Therefore, in the processing of such materials prime consideration must be given the relationships of temperatures and dwell times to which the material must be subjected in order to effect joining. These relationships (time and temperature) are critical since recrystallization and grain growth begin to occur in the object material immediately upon its entering the recrystallization zone. The degree of recrystallization is directly proportional to dwell time and to the amount by which the initial recrystallization temperature is exceeded, and thus the total temperate gradient experienced.

To the present time the radiant, vacuum-type furnace has usually been employed to join high temperature resistant super alloy or refractory type metal members.

Inasmuch as this type furnace effectively produces only radiant heat, it has an exceedingly poor rate of heat transfer. This is due to the relatively wide spacial disposition of the tantalum heaters used therein, in relation to the object workpiece as well as to a lack of transmitting atmosphere. Such furnaces therefore have not been capable of satisfactorily brazing refractory metals and super alloy metals. Because of the exceptionally high current required, the state-of-the-art heaters employed cannot be closely spaced without engendering direct arcing or shorting between heater and workpiece.

In the operation of such a conventional radiant heat vacuum furnace, the support fixture and insulation masses must also be substantially saturated with heat along with the mass of the workpiece because of the above mentioned widely spaced relationship of heaters and work. Obviously, the aggregate of masses of all these elements constitutes a large mass, which, in view of an extremely inefficient heat transfer gradient, results in a heating rate that is exceptionally slow and inefficient.

In the present invention, shorting is precluded even though the tantalum employed are disposed in much closer proximity to each other than has heretofore been possible. Thus an increased concentration of heaters within the work area vastly increases efficiency and permits the brazing temperature to be driven much higher during any given time period.

With the brazing temperature substantially above the point at which recrystallization begins, it is obvious that the time required to achieve the brazing temperature—time within the recrystallization zone—is extremely critical, and that prior furnaces having inherently slow and inefficient heating rates destroy the intrinsic strength and heat resistant qualities of the material upon which they were designed to operate.

It has been demonstrated that time within the recrystallization zone is extremely detrimental to various materials and that great inefficiences result as an effect of the slow heating rate. However, a slow cooling rate is obviously equally as detrimental. Therefore, any process must be evaluated by the total time it requires within this zone, which determines the extent of joint degradation that is ultimately sustained by the materials involved. As hereinabove mentioned, all interior components of the conventional furnace and the workpiece must be saturated with heat to attain the metal bond. This results in substantial residual heat at the termination heating cycle. This residual heat dictates the necessity for an extremely long cooling cycle, thus further lengthening the time that the object material is sustained above its recrystallization point.

Another deleterious characteristic of the prior devices and their resultant methods resides in the high initial expenses of fabrication and subsequent excessive cost of operation due to inherent inefficiency.

Another apparatus which is similar in principle, although totally differentiated in result, to that of the present invention is disclosed in the T. A. Herbert patent, No. 3,033,973. This apparatus is of the electric blanket type and permits better dwell times than those delineated above. Even so, this device is limited by the type of heater and electrical and thermal insulators employed therein to a maximum operational temperature of 1700° F. This limitation precludes its employment in processing of the exotic and refractory metals made possible by the present invention.

The present invention resides primarily in the novel utilization of a thermally stable electrical insulator which exhibits an extremely high rate of heat transfer through conduction while being, at the same time, metallurgically compatible with the refractory metal heaters employed therewith. This extremely high rate of heat transfer and metallurgical compatibility permits the attainment of extremely high temperatures with very brief heating-cooling cycles. This ability permits the requisite super alloy or refractory metal brazing temperature to be attained, but prevents temperature maintenance above the recrystallization temperature for time intervals which cause substantial degradation of the joint. That is, the present invention permits attainment, for the first time, of proper temperature-dwell time relationships permissive of achieving metallurgically and structurally satisfactory bonds between super alloy and refractory metals in an economical and relatively simple device capable of general utilization by any person having skill in the art.

Specifically, the device of the present invention employs a thermally stable ceramo-metallic or refractory oxide type electrical insulator in combination with refractory metal heaters, the insulation being interposed between parallel, juxtapositioned ribbon heaters and the object workpiece. Such positioning permits the optimum current, heating-time cycle, and efficiency, but prevents direct electrical shorts or arcing.

In the preferred embodiment of the present invention the heaters are disposed upon either side of the workpiece having only insulators therebetween, thus preventing electrical shorts as hereinabove stated. This configuration allows the workpiece to be substantially in physical contact with the heating media. Obviously, this method of heating possesses an intrinsically high rate of thermal conduction and efficiency, thereby promoting very rapid heating rates. Further, since the heaters are adjacent to the workpiece, and the heat generated is confined by suitable means to the area occupied by the workpiece, only the areas immediately adjacent to the workpiece are heated, thereby substantially reducing the mass that is heated, as well as substantially reducing residual heat. The combination of contact heating, high power inputs, and reduction of the mass that is to be heated results in a significant reduction of the dwell time within the recrystallization zone, and allows greater temperatures to be reached much more rapidly. These facts, in combination with the reduction of residual heat and a flow argon atmosphere further result in a very abrupt cooling cycle.

Ceramo-metallic insulators are also employed to preclude deleterious chemical reactions experienced when the refractory metal heaters contact the thermal insulating means. This chemical reaction, if allowed, results in the deterioration of the heaters and subsequently in heater failure. Further, such insulators function as a heat distributing means, which is important because the heat generated by the heaters is localized due to their strip configuration. This distribution is effected due to the positioning of the electrical insulators between the work and heating media, thereby uniformly conducting the generated heat over the entire area to be joined.

The novel combination of elements of the device of the present invention permits its efficient operation up to a maximum temperature of between 3900° F. to 4700° F. dependent upon the type of insulator used.

Ceramo-metallic or refractory oxide insulators according to the present invention are comprised of a refractory metal sheet, which in the preferred embodiment is molybdenum and an oxide coating. The metal sheet is slightly larger than the workpiece to permit beveling at the edges, thus precluding abrasions in the oxide coating and avoiding sharp edges at any point of contact with the heaters. The refractory oxide insulator coating may be applied in either of two methods.

One method is to first paint a thin coat of levigated alumina on the refractory sheet in a slurry of 2 percent poly-vinyl-alcohol and 5 percent sodium silicate and subsequently bake the encapsulated sheet at 250° F. until dry. The sodium silicate improves adherence of the oxide to the sheets. A second identical coat is then applied 90 degrees to the strokes of the first coat. The second coat is followed by a baking at 900° F. for one hour to drive off the major portion of the poly-vinyl-alcohol. The alumina alcohol-sodium silicate mixture should preferably be about the consistency of oil base paint. It should be noted that the insulators are not limited to molybdenum sheets or aluminum oxide for any refractory metal and that most oxides will suffice, however, beryllium oxide, magnesium oxide and thorium oxide have been found to be the most useful. A second method of application resides in flame spraying the oxide to the supporting molybdenum sheet and has been found to be extremely satisfactory. Obviously, the method employed is a matter of choice.

The salient object of the present invention is therefore to provide an apparatus operable within an extended range of temperatures up to approximately 4700° F. and capable of favorable dwell times, and a process to effect both brazing and diffusion joining of refractory metals and super alloys, thereby permitting fabrication of high temperature structural components, such as low density cellular core and honeycomb sandwich panel, while simultaneously precluding detrimental changes within the crystalline structure thereof.

It is another object of the invention to provide an electrical insulator possessing a very high heat transfer rate which comprises a refractory metal sheet encapsulated within a refractory oxide coating. Such coating permits contact heating of the workpiece thereby reducing the time required for the heating and cooling cycles.

It is still another object of the present invention to provide an apparatus of the class described which employs high temperature refractory metal resistance heaters.

It is yet another object to reduce high tooling and fabrication costs of presently available brazing apparatus.

Other and further features and object of this invention will become apparent to those skilled in the art in light of the following specification and drawings wherein.

Figure 1:
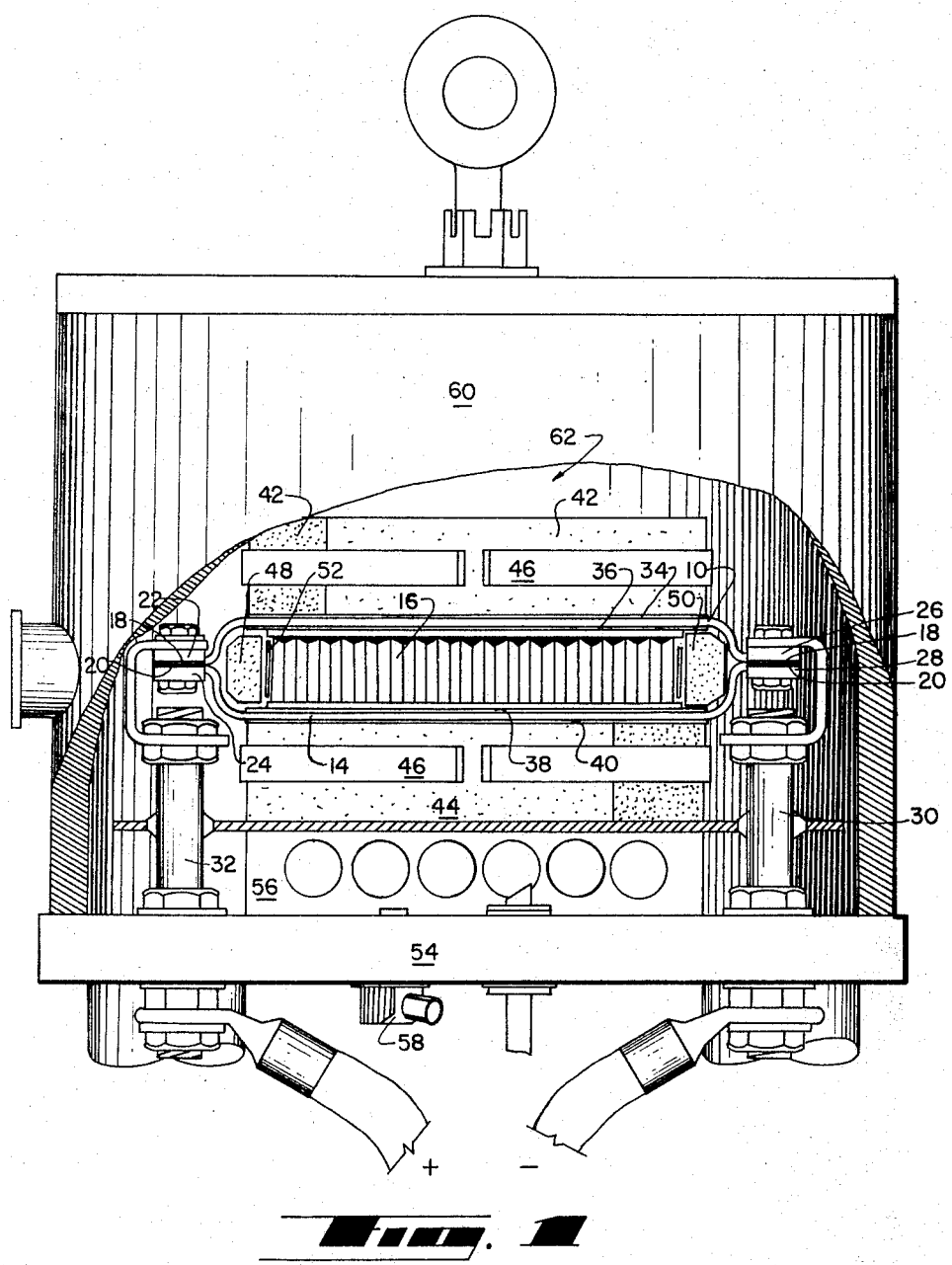
FIGURE 1 is an elevational view, partly in section, of the device of the present invention in the preferred form.
Figure 2:
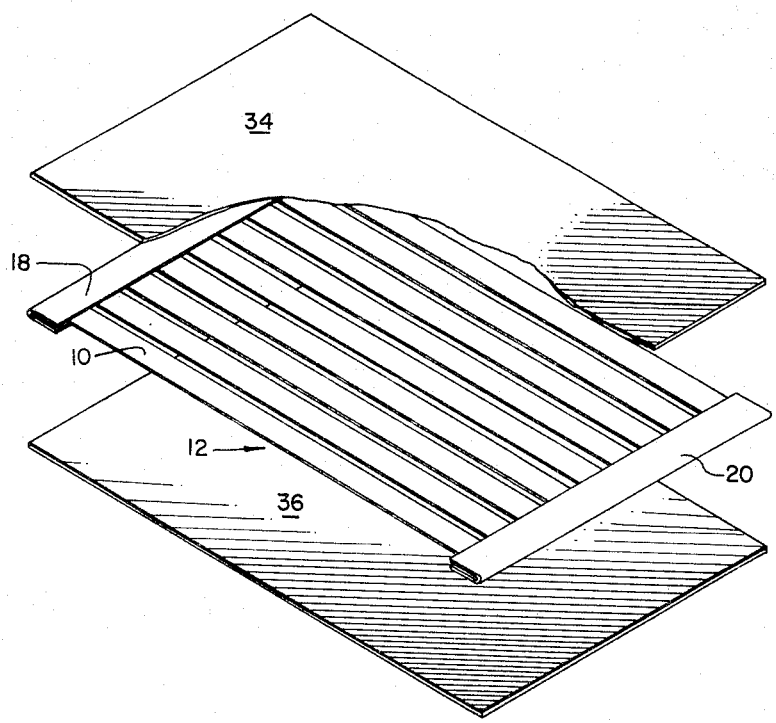
FIGURE 2 is a pictorial, exploded view of the heaters and separators of the present invention revealing their typical relation to each other.

The preferred embodiment of the present invention, as shown generally in FIGURE 1, comprises a plurality of parallel juxtapositioned ribbon resistance heaters (best shown in detail in FIGURE 2), which heaters form heater banks 12 and 14, heater banks 12 and 14 being employed on diametrically opposed sides of a workpiece 16. Heater banks 12 and 14 are evenly spaced over the area to be processed and comprise a plurality of pure molybdenum ribbons, which in one preferred embodiment are 19/32 of an inch wide, .002 of an inch thick and 14 inches long. Spacing of ribbon elements 10 is maintained by doublers 18 and 20 positioned across the ribbons at their longitudinal extremities. It has been found that spot welding .005 inch columbium strips is satisfactory. Contact strips 22, 24, and 26, are positioned on the ends of heater banks 12 and 14 respectively to transmit electrical power to the individual heater strips 10. This power transmission is accomplished by connection to two copper bus bars 30 and 32, which are subsequently attached to a D.C. power supply shown schematically in FIGURE 1.

Electrical insulation between heater banks 12 and 14 and workpiece 16, as well as hereinafter described insulating bricks, is effected by four thin ceramo-metallic insulators 34, 36 and 38, 40 illustrated in FIGURE 1. Insulating bricks 42, which in one preferred configuration are 8 inches in length, 8 inches in width and 2½ inches in height, are employed to localize heat. Bricks 42 are bound together into slabs 44 by an adjustable strap 46 which may be of A-286 alloy. Bricks 42 are positioned as illustrated in FIGURE 1 above and below workpiece 16, and its associated insulators 34, 36, heater banks 12 and 14 and insulators 38, 40 respectively. Prior to the placement of edge bricks 48 and 50, a strap 52, which may be of titanium or the like, is positioned around the periphery of the workpiece to further prevent heat loss and to burn any oxygen present. Edge bricks 48 and 50 in one preferred embodiment 8 inches in length, ½ of an inch in height and ⅝ of an inch in width, and are placed around the edges of workpiece 16 adjacent to strap 52. A small aperture (not shown) may be desirable for optically measuring the interior temperatures at the workpiece.

All of the above described components are positioned on a suitable base 54 having spacers 56 thereon in order to position the workpiece in proper relation to the heaters. A suitable argon inlet 58 is mounted within base 54. Base 54 is subsequently provided with an air tight cover 60 thereby effectively forming a retort. Weights 62, as shown in FIGURE 1, may be employed to obtain any required pressure on workpiece 16 and are positioned upon upper insulating bricks 42. Other means of applying pressure may be employed such as differential pressure and/or any suitable mechanical, hydraulic or pneumatic means.

The process of the present invention is initiated with a first purge of retort 60. It has been found to be desirable to employ a three cycle purge. Each cycle consists of vacuum pumping to less than 200 microns absolute pressure, followed by back filling with argon to ambient pressure. After purging is complete, the argon flow is adjusted to a steady 20 ft.³/hr.

After purging the heating cycle is accomplished in two steps. The first step involves removal of an acrylic resin matrix in the powdered braze alloy and may be omitted if such a material is not employed. Where employed, this step consists of slowly increasing the temperature to approximately 1600° F. and holding at this temperature until all signs of smoke disappear. The second step resides primarily in rapidly increasing the power input to achieve a rate of heating of approximately 200° F. per minute. This rate is maintained until the recrystallization zone is reached. At this time, the input is suddenly increased, resulting in an extremely rapid increase to brazing temperature. This increase normally requires only thirty seconds. Power is then terminated in order to minimize dwell time above the recrystallization temperature of the material to be brazed. The cooling rate is then recorded in one minute increments down to about 1100° F. In this process, employing the disclosed apparatus, the refractory materials being joined are within the recrystallization zone less than one minute, thus precluding detrimental recrystallization and grain growth.

For example, in a preferred embodiment wherein the material to be brazed is columbium FS-82 alloy, the process employed is as follows: The material was set up in accordance with the prior description. The retort was purged three times as explained above. The temperature was raised gradually to 1600° F. and held until "smoking" disappeared. The power input was rapidly increased to 7 kilowatts, resulting in a rate of heating of about 200° F. per minute, which rate was maintained until a temperature of 2300° F. was achieved. The input was then increased suddenly to 8 kilowatts, resulting in a very rapid increase to the brazing temperature. This increase required only 30 seconds to complete. Power was then terminated, permitting a very rapid temperature falloff to below the recrystallization zone. The material was within this zone for less than 60 seconds total.

This is best illustrated in the following sandwich panel column compressive tests which verify that the present invention effects joining without significant recrystallization and grain growth with their corresponding loss of mechanical properties.

| Run No. | Panel Material Columbian Alloy | Room Temp. Column Compressive Strength After Brazing (p.s.i.) | Room Temp. Ultimate Tensile Strength of Skin Materials Before Brazing (p.s.i.) |
| --- | --- | --- | --- |
| 11071 | FS-82 | 125,000 | 97,000 |
| 10251 | D-43 | 114,000 | 95,000 |
| 11111 | CB-752 | 95,000 | 83,600 |
| 11051 | B-66 | 142,000 | 115,500 |

Industry wide evaluations of brazed sandwich panels indicate that in the optimum condition, column compressive strengths should equal or slightly exceed the ultimate tensile strength of the skin material before brazing, thus indicating retention of full tensile properties in substantial absence of recrystallization and grain growth. As is obvious from the above, this condition is fully satisfied in materials brazed by the process of the invention.

As thus described above in detail, the present invention for the first time provides a practical process and apparatus operative to braze or diffusion join refractory or super alloy materials without loss of desirable structural characteristics through intrinsic recrystallization and grain growth.

This is made possible by employment of a heat source comprising refractory metal strip resistance heaters. These heaters, due to their construction and ceramo-metallic insulation, may be positioned in very close proximity both to each other and to the workpiece being joined. This in turn effects a rapid heating cycle through extremely high heat transfer efficiency. In addition, such positioning substantially precludes extraneous heating of supporting and insulating components and thus deters any buildup of residual heat. This effectively decreases the cooling cycle, which in combination with the related rapid heating rates achievable by the invention appreciably reduces dwell time within the recrystallization and grain growth zone.

What is claimed is:
1. A process for joining refractory metals and super alloys without substantially deleterious recrystallization therein comprising:
    (A) selecting the material to be joined;
    (B) positioning said material in a closed environment; and in contact with a refractory metal electrical resistance heater means and applying a braze alloy to the surfaces of said material to be joined;
    (C) heating said material slowly by controlled graduated steps to a point just below that at which recrystallization begins;
    (D) causing the temperature of said material to rapidly increase to the brazing temperature of said selected material;
    (E) terminating the temperature producing function and effecting a rapid temperature decrease in said selected material to a point below the recrystallization zone for said selected material so that the material is above the point at which recrystallization begins for no more than sixty seconds.

2. The process as defined by claim 1 wherein the braze alloy is a powdered alloy in an acrylic resin binder and said step of heating by controlled graduated steps includes:
    removing said acrylic resin binder by heating said material to substantially 1600° F. and holding until smoke disappears.

3. A process for brazing refractory and super alloy materials resultant in a maximum of about 5% recrystallization and thus precluding significant loss of mechanical properties comprising:
    (A) selecting the materials to be joined and applying a braze alloy thereto in the areas to be joined;
    (B) positioning the materials between and in contact with refractory metal insulative separator means to provide substantially uniform, direct heating of said selected material by a heater;

(C) providing a refractory metal, rapid electrical resistance heater means in contact with the separator means;

(D) positioning second separator means on the heater means to provide electrical insulation;

(E) thermally insulating the materials, heater means and separators;

(F) purging the environment around said selected materials;

(G) slowly raising the temperature of said materials to a temperature of approximately 1600° F. by controllably activating the heater means;

(H) rapidly raising the temperature of said materials at about 200° F. per minute to a first point just below that at which recrystallization of said selected metals begins;

(I) raising the temperature from said first point to the materials brazing point in about thirty seconds;

(J) terminating the temperature imparting operation to cause a rapid temperature drop in about thirty seconds to a second point below the recrystallization zone to thus minimize dwell time.

References Cited

UNITED STATES PATENTS

| | | | |
|---|---|---|---|
| 3,047,710 | 7/1962 | Rowe | 219—85 |
| 3,053,969 | 9/1962 | Kerr et al. | 219—85 |
| 3,067,508 | 12/1962 | Kinelski | 29—487 |
| 3,167,634 | 1/1965 | Kreiter et al. | 219—118.2 X |
| 3,173,813 | 3/1965 | Dewey et al. | 148—127 X |
| 3,276,113 | 10/1966 | Metcalfe | 29—487 |

OTHER REFERENCES

"Molybdenum, Production, Properties and Applicants," by G. L. Miller, "Metal Industry," Nov. 18, 1949, pages 439–441.

RICHARD M. WOOD, *Primary Examiner.*

B. A. STEIN, *Assistant Examiner.*